(12) United States Patent
Lee et al.

(10) Patent No.: US 12,519,544 B2
(45) Date of Patent: Jan. 6, 2026

(54) OPTICAL LINK ARCHITECTURE

(71) Applicant: NVIDIA Corporation, Santa Clara, CA (US)

(72) Inventors: Benjamin Giles Lee, Ridgefield, CT (US); Meer Nazmus Sakib, Berkeley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 287 days.

(21) Appl. No.: 18/474,698

(22) Filed: Sep. 26, 2023

(65) Prior Publication Data

US 2025/0105920 A1 Mar. 27, 2025

(51) Int. Cl.
*H04B 10/40* (2013.01)
*H04B 10/80* (2013.01)
*H04J 14/02* (2006.01)

(52) U.S. Cl.
CPC .......... *H04B 10/40* (2013.01); *H04B 10/801* (2013.01); *H04J 14/0202* (2013.01)

(58) Field of Classification Search
CPC .... H04B 10/40; H04B 10/801; H04J 14/0202
USPC ........................................ 398/135
See application file for complete search history.

(56) References Cited

U.S. PATENT DOCUMENTS

| 9,705,630 | B2 * | 7/2017 | Liboiron-Ladouceur ............ G02B 6/2938 |
| 12,298,564 | B2 * | 5/2025 | Bhargava ........... G02B 6/29343 |
| 2010/0183309 | A1 * | 7/2010 | Etemad ................. H04J 14/007 398/79 |
| 2017/0070313 | A1 * | 3/2017 | Kato .................... H04J 14/0205 |
| 2020/0021385 | A1 * | 1/2020 | Stojanovic .......... H04J 14/0209 |
| 2020/0092025 | A1 * | 3/2020 | Sahni ..................... G02B 6/272 |
| 2020/0204258 | A1 * | 6/2020 | Bravi ................... H04B 10/503 |
| 2021/0149115 | A1 * | 5/2021 | Huang ................... H04B 10/66 |

OTHER PUBLICATIONS

"Tutorial on Bi-Directional Transmission Technology"; FS community; Aug. 15, 2016; https://community.fs.com/blog/tutorial-on-bi-directional-transmission-technology.html; 2 pgs.

* cited by examiner

*Primary Examiner* — Dalzid E Singh (57) ABSTRACT

An optical apparatus, with an optical interconnect, the optical interconnect including a first optical transceiver having a first notch filter, the first notch filter including first and second optical add drop multiplexer demultiplexers connected to receive a continuous wave light beam and send a first and second filtered wavelengths to first and second resonant modulators which send first and send modulated optical signals through a light propagation path. The second filtered wavelength is different from the first filtered wavelength, and the second modulated optical signal has a polarity that is orthogonal to a polarity of the first modulated optical signal. Methods of communicating using the apparatus and an optical filter for use in an optical transceiver are also disclosed.

23 Claims, 9 Drawing Sheets

FIG. 8B

OPTICAL LINK ARCHITECTURE

TECHNICAL FIELD

This application is directed, in general, to optical communications, and in particular, an optical apparatus including one or more optical interconnects, and, methods of communicating using the optical apparatus.

BACKGROUND

It is desirable to increase bandwidth density in optical interconnects in a cost- and power-efficient manner. One approach is to use a combination of wavelength-, polarization-, and/or directional-multiplexing. Multiplexing and demultiplexing devices (in wavelength, polarization, and/or directional domains) can combine an array of modulator ports and/or detector ports at two end points of a link into a single medium such as an optical fiber for transmission between the end points. The design of each of these multiplexing and demultiplexing devices, however, often involves an optimization process in which insertion loss is traded against inter-channel crosstalk, as well as other performance metrics.

SUMMARY

One aspect provides an optical apparatus including an optical interconnect. The optical interconnect includes a first optical transceiver, the first optical transceiver including a first notch filter. The first notch filter includes a first optical add drop multiplexer demultiplexer connected to receive a continuous wave light beam and send a first filtered wavelength of the continuous wave light beam to a first resonant modulator. The first resonant modulator is connected to send a first modulated optical signal in a first direction through one end of a light propagation path. The first notch filter also includes a second optical add drop multiplexer demultiplexer connected to receive the continuous wave light beam and send a second filtered wavelength of the continuous wave light beam to a second resonant modulator, the second resonant modulator connected to send a second modulated optical signal in the first direction through the end of the light propagation path. The second filtered wavelength is different from the first filtered wavelength and the second modulated optical signal has a polarity that is orthogonal to a polarity of the first modulated optical signal.

Another aspect is a method of communicating using an optical apparatus including: receiving, to a first notch filter of an optical transceiver of an optical interconnect of the apparatus, a continuous wave light beam having a first wavelength and a second wavelength; outputting, from the first notch filter, filtered ones of the first wavelength and the second wavelength; receiving, to a first resonant modulator of the optical interconnect, the first wavelength; generating a first modulated optical signal of the first wavelength; generating a first modulated optical signal of the first wavelength; outputting the first modulated optical signal in a first direction through one end of a light propagation path optically coupled to the first resonant modulator; receiving, to a second resonant modulator of the optical interconnect, the second wavelength; generating a second modulated optical signal of the second wavelength; generating a second modulated optical signal of the second wavelength; and outputting the second modulated optical signal in the first direction through the one end of the light propagation path optically coupled to the second resonant. the second filtered wavelength is different from the first filtered wavelength and the second modulated optical signal\has a polarity that is orthogonal to a polarity of the first modulated optical signal.

Another aspect is a optical filter for use in an optical transceiver. The optical transceiver includes a first and second resonant modulator. The first resonant modulator is connected to send a first modulated optical signal in a first direction through a first end of a light propagation path, the first modulated optical signal having a first polarity. The second resonant modulator is connected to send a second modulated optical signal in the first direction through the first end of the light propagation path, the second modulated optical signal having a second polarity orthogonal to the first polarity. The optical transceiver also includes a first and second optical add drop multiplexer demultiplexer. The first optical add drop multiplexer demultiplexer is connected to receive a continuous wave light beam and send a first filtered wavelength of the continuous wave light beam to the first resonant modulator. The second optical add drop multiplexer demultiplexer is connected to receive the continuous wave light beam and send a second filtered wavelength of the continuous wave light beam to the second resonant modulator. The second filtered wavelength is different from the first filtered wavelength.

BRIEF DESCRIPTION

Reference is now made to the following descriptions taken in conjunction with the accompanying drawings, in which.

DETAILED DESCRIPTION

Embodiments of the disclosure follow from our study of designing high speed scaling optical interconnects that are simple to implement, and, avoid complex wavelength filtering designs that are both expensive and prone to introducing impairments, e.g., due to the narrow bandwidth of filter shapes or amplitude ripple in the pass band or group velocity dispersion associated with the filter itself.

As further illustrated in the example embodiments disclosed herein, we accomplish this by performing wavelength filtering before optical modulation and by not overloading any one encoding multiplexing dimension to avoid introducing in the crosstalk associated with e.g., a larger number of channels on a wavelength dimension. Wavelength filtering before optical modulation is in contrast to, and the opposite of, standard approaches for wavelength and polarization multiplexing, where wavelength filtering of the high-speed optical signal in the multiplexer and/or demultiplexer can cause significant penalties arising from narrow bandwidths, passband ripple, or group velocity dispersion. Herein, by exchanging the order of modulating and wavelength filtering so that the filtering happens before modulation, an optical data signal does not encounter optical filtering, resulting in negligible filtering penalties. Additionally, to avoid overloading any one physical dimension of propagation direction, polarization, and wavelength, no two optical states are shared in a same dimension. E.g., only half of the eight possible encoded channel states are populated and the states are selected to ensure that no two channels overlap in two of the three dimensions for carrying optical data signals.

One aspect of the disclosure is an optical apparatus. FIGS. 1-7 present various aspects of embodiments of example optical apparatuses 100 of the disclosure.

Figure 1:
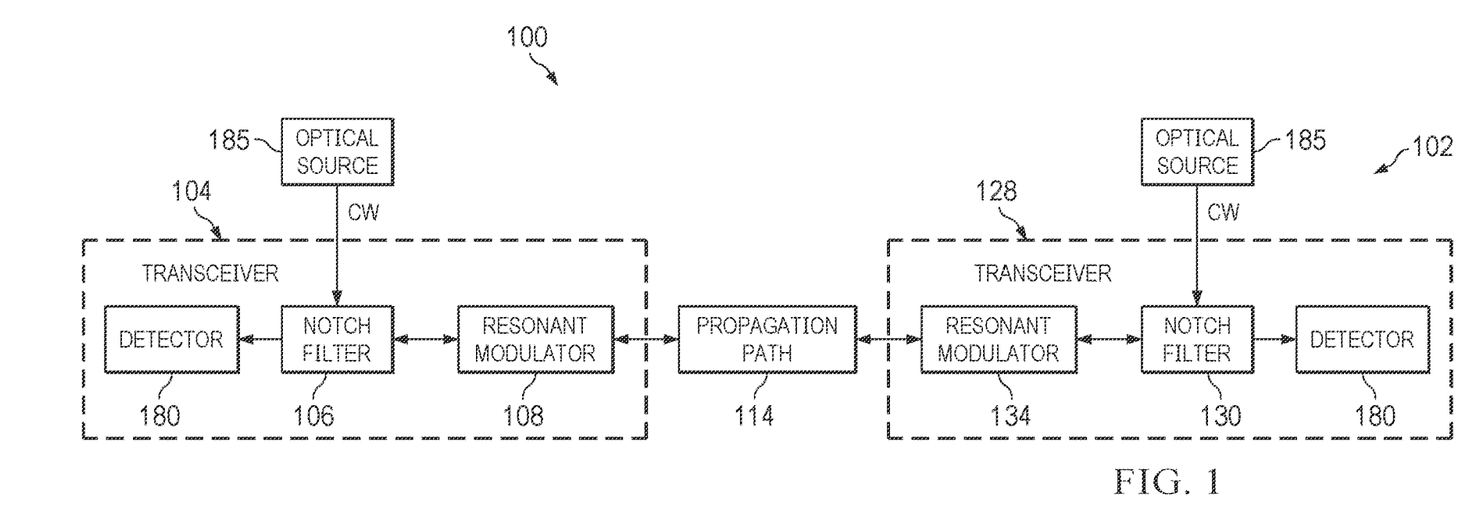
FIG. 1 presents a block diagram of an example embodiment of an optical apparatus of the disclosure.
Figure 2:
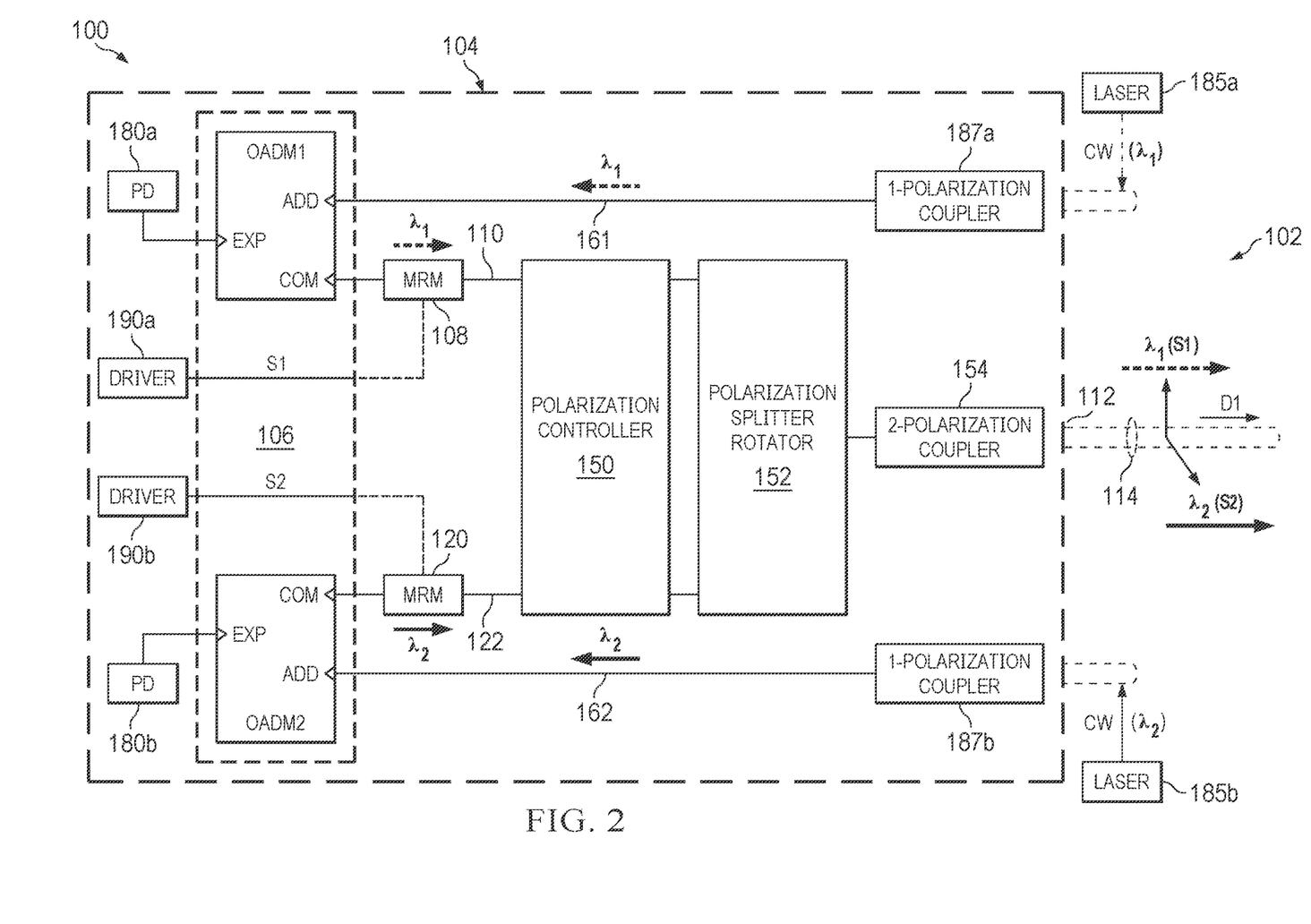
FIG. 2 presents a schematic diagram showing aspects of an example apparatus of the disclosure including a transceiver.
Figure 3:
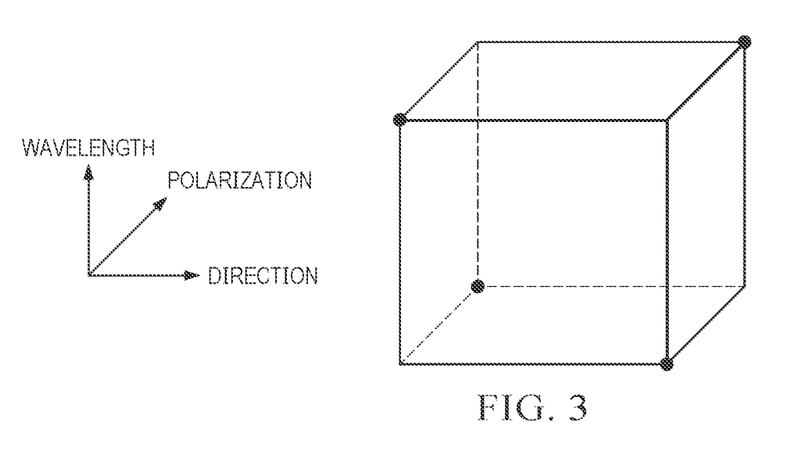
FIG. 3 presents a diagram showing a graphical representation of example encoding states of a optical channel communicating an optical signal in a embodiment of the optical apparatus of the disclosure.

FIG. 1 presents a block diagram and FIG. 2 presents a schematic diagram of an example embodiment of an optical apparatus of the disclosure including a transceiver. FIG. 3 presents a diagram showing a graphical representation of example encoding states of an optical channel communicating an optical signal for an embodiment of the optical apparatus of the disclosure.

With continuing reference to FIGS. 1-3, embodiments of the optical apparatus 100 can include an optical interconnect 102 that can include an optical transceiver (e.g., first optical transceiver 104). The first optical transceiver can include a first notch filter 106 which can include a first optical add drop multiplexer/demultiplexer (e.g., OADM1, FIG. 2) and a second optical add drop multiplexer/demultiplexer (e.g., OADM2, FIG. 2). The first optical add drop multiplexer/demultiplexer can be connected to receive a continuous wave (CW) light beam and send a first filtered wavelength (e.g., λ1, FIG. 2) of the continuous wave light beam to a first resonant modulator 108. The first resonant modulator can be connected to send a first modulated optical signal 110 (e.g., S1, FIG. 2) in a first direction (e.g., D1, FIG. 2) through an end 112 of a light propagation path 114 (e.g., FIG. 2; one or more waveguides such as an optical fiber). The second optical add drop multiplexer/demultiplexer (OADM2) can be connected to receive the continuous wave (CW) light beam and send a second filtered wavelength (e.g., λ2, FIG. 2) of the continuous wave light beam to a second resonant modulator 120, the second resonant modulator connected to send a second modulated optical signal 122 (e.g., S2, FIG. 2) in the first direction D1 through the end 112 of the light propagation path 114. The second filtered wavelength λ2 is different (e.g., at least ±1 nm, ±5 nm or ±10 nm different in some embodiments) from the first filtered wavelength λ1, and, the second modulated optical signal 122 has a polarity that is orthogonal to a polarity of the first modulated optical signal 110.

For instance, as illustrated in FIG. 3, while there are 8 states or domains that can be populated per light propagation path (e.g., optical fiber) using 2 directions, 2 polarizations, and 2 wavelengths, for the apparatus of the present disclosure only 4 of the 8 states are populated. Since no two states share an edge (which means that no two channels overlap in two of the three dimensions of direction, polarization, and wavelength), crosstalk rejection requirements for the components are relaxed as compared to all 8 states being populated.

That is, the apparatuses of the disclosure multiplex by a factor of 2 in each of the wavelength, space and polarization domains. However, rather than using that 8× multiplexing to scale the bandwidth per fiber by 8 times the channel rate, only half of the channel states are populated, and the populated states are selected uniquely. The specific selection of the states, firstly, guarantees that no two channels overlap in two of the three dimensions at any time. We believe that this significantly reduces device crosstalk requirements, potentially allowing a designer to shift toward lower loss or lower complexity designs.

Additionally, the state selection in accordance with our disclosure facilitates each propagation path (optical fiber) being indistinguishable from every other propagation path in a simplex cable configuration. E.g., there may be no fixed or set transmitter (TX) and receiver (RX) ports, and in such cases, optical fibers may be provisioned in even or odd counts, including a single fiber used to connect two end points, with a same transceiver and a same optical source at each end of the fiber. Such a configuration can be facilitated by making the polarization domain institute an orthogonal rotation of the wavelength assignment between the forward and backward propagating directions. Since polarization rotation in the fiber can be arbitrary the end point of the fiber can be assigned the correct polarity (e.g., TX or RX) simply by rotating the polarization of the received or transmitted signal.

Consequently, the optical link architecture embodied in the optical apparatuses as disclosed herein, relocates the optical wavelength-filtering (e.g., multiplexing and demultiplexing) out of the traditional location (e.g., between the modulator and detector) where it can cause penalties due to high-frequency attenuation, amplitude ripple, or group delay. Moreover, for the optical apparatuses disclosed herein, optical wavelength filters can be implemented as add/express filters, where a narrowband add function is performed on a continuous-wave (e.g., unmodulated) signal, and the express (e.g., broadband) function provides a wide and non-interfering passband for the counter-propagating modulated signal.

Figure 4:
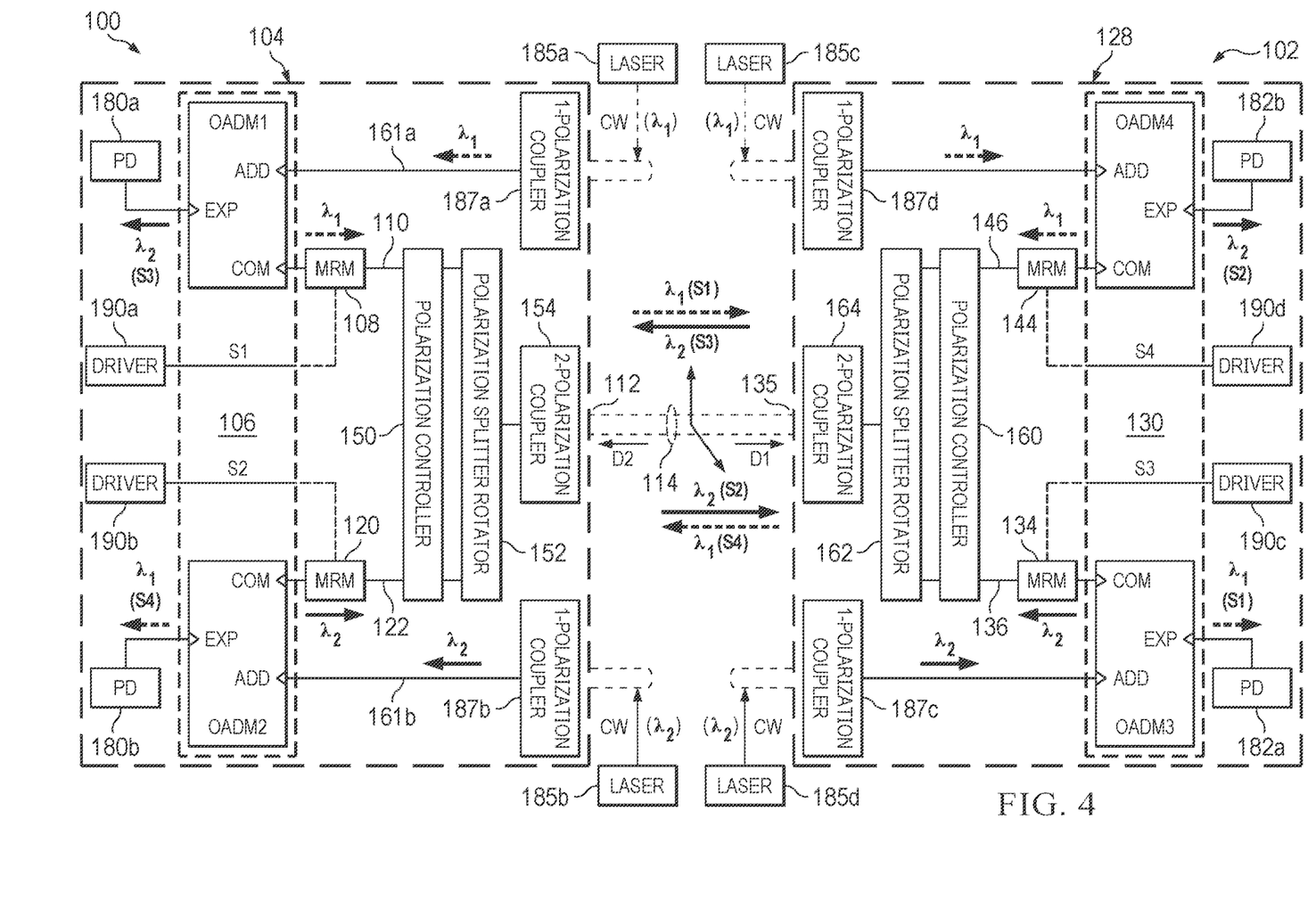
FIG. 4 presents a schematic diagram showing aspects of another example apparatus of the disclosure including a pair of transceivers.

As further illustrated in FIGS. 1 and 4, some embodiments of the optical interconnect 102 further include a second optical transceiver 128, the second optical transceiver including a second notch filter 130. The second notch filter can include a third optical add drop multiplexer/demultiplexer (e.g., OADM3) connected to receive the CW light beam and send the second filtered wavelength (e.g., λ2) of the CW light beam to a third resonant modulator 134. The third resonant modulator can be connected to send a third modulated optical signal 136 (e.g., S3) in a second direction (e.g., D2) through an opposite end 135 of the light propagation path 114, where the second direction is opposite the first direction.

The second notch filter 130 can also include a fourth optical add drop multiplexer/demultiplexer (e.g., OADM4) connected to receive the CW light beam and send the first filtered wavelength (e.g., λ1) of the CW light beam to a fourth resonant modulator 144. The fourth resonant modulator can be connected to send a fourth modulated optical signal 146 (e.g., S4) in the second direction through the opposite end 135 of the light propagation path 114, where the third modulated optical signal 136 has a polarity that is orthogonal to a polarity of the fourth modulated optical signal 146.

For instance, as illustrated in FIG. 4, the apparatus 100 can have a simplex capable configuration and in some embodiments identical transceivers 104, 128 and identical optical inputs at both endpoints of the light propagation path 114 (e.g., ends 112, 135). There can be four data lanes (e.g., S1 ... S4) per path 114 (e.g., equivalent in capacity to 1D-1P-4λ or 1D-2P-2λ). For instance, the second transceiver can send data signals, S3 and S4, and receiving data signals, S1 and S2. As a result of there being no wavelength filtering of modulated light wavelengths, there can be reduced or no penalties from narrowband filtering, amplitude ripple and/or group delay. Such a two wavelength (λ1 and λ2) architecture for additional signal generation helps mitigate the risks imposed by going from two to four wavelength optical sources and helps to keep required optical bandwidth of photonic components constrained.

With continuing reference to FIG. 2, in some embodiments of the apparatus 100 the first resonant modulator 108 includes a first micro-resonant modulator (e.g., MRM) to produce the first modulated optical signal 110 at the first filtered wavelength (e.g., λ1). As illustrated, the first modulated optical signal 110 can be optically coupled to a polarization controller 150 (Pol. Ctril.), a polarization splitter rotator 152 (e.g., PSR) and a polarization coupler 154 (e.g., 2-Pol Cplr) to the one end 112 of the light propagation path 114 to send the first modulated optical signal 110 in the first direction (e.g., D1).

As further illustrated in FIG. 4, the second resonant modulator 120 can further include a second micro-resonant modulator to produce the second modulated optical signal 122 at the second filtered wavelength (e.g., λ2), the second modulated optical signal 122 optically coupled to the polarization controller 150, the polarization splitter rotator 152 and the polarization coupler 154 and to the one end 112 of the light propagation path 114 to send the second modulated optical signal 122 in the first direction (D1).

Figure 5:
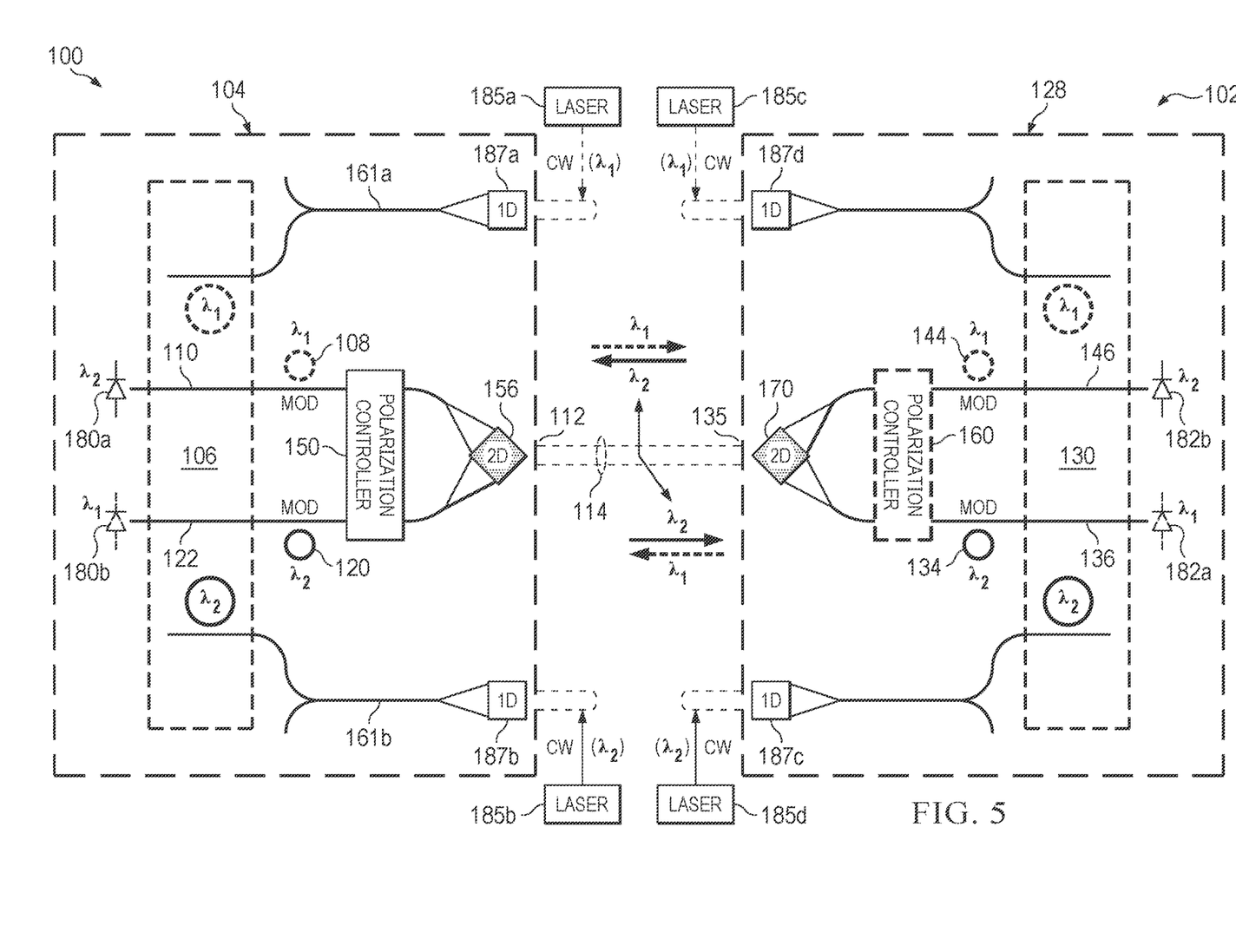
FIG. 5 presents a schematic diagram showing aspects of another example apparatus of the disclosure similar to the apparatus depicted in FIG. 4.

As further illustrated in FIG. 5, in some embodiments of the apparatus 100, the polarization splitter rotator 152 and the polarization coupler 154 (FIGS. 2 and 4) can be combined in a two dimensional (2D) grating coupler 156. The term combined as used herein refers to the two dimensional coupler's 156 ability to perform the both functions of the polarization splitter rotator and the polarization coupler. The polarization coupler's function is to couple light to or from a first polarization of a waveguide (e.g., an on-chip waveguide 161a) from or to a first polarization of the transport light propagation path 114 and to or from a second polarization of a second waveguide (e.g. a second on-chip waveguide 161b) from or to, respectively, a second polarization of the transport light propagation path 114. The polarization splitter rotator's function is to couple the two polarizations in one on-chip waveguide (e.g., transverse electric, TE, polarization and transverse magnetic, TM, polarization) into or out of the same polarization (e.g., TE or TM) in two separate on-chip waveguides. The 2D grating coupler 156 combines both sets of functions by coupling two polarizations to or from the transport waveguide light propagation path 114 from or to two on-chip waveguides with the same polarization.

As further illustrated in FIG. 4, the third resonant modulator 134 can include a third micro-resonant modulator to produce the third modulated optical signal 136 at the second filtered wavelength λ2, the third modulated optical signal 136 optically coupled to a second polarization controller 160, a second polarization splitter rotator 162 and a second polarization coupler 164 to the opposite end 135 of the light propagation path 114 to send the third modulated optical signal 136 in the second direction (e.g., D2).

The polarization controllers 150, 160 can advantageously align the polarization of the transmitted or received signals (e.g., S1, S2 and S3, S4) with respect to the transceivers 104, 128 at the other end of the light propagation path 114. E.g., an optical fiber that provides the path 114 can perform an arbitrary polarization rotation and the polarization controllers 150, 160 can realign the local polarization to the remote axis. Because the polarization rotation caused by the light propagation path 114 is often a linear process, in some embodiments only one polarization controller (e.g., one of polarization controllers 150 or 160) may be required, but in some embodiments, polarization controllers 150, 160 can be included one at both ends 112, 135 for symmetrical realignment.

The polarization rotation in the fiber may drift over time and so a closed-loop tracking system can be placed around the polarization controller.

As also illustrated in FIG. 4, the fourth resonant modulator 144 can include a fourth micro-resonant modulator to produce the fourth modulated optical signal 146 at the first filtered wavelength λ1, the fourth modulated optical signal 146 optically coupled to the second polarization controller 160, the second polarization splitter rotator 162 and the second polarization coupler 164 to send the fourth modulated optical signal 146 in the second direction D2.

As illustrated in FIG. 5, in some embodiments the second polarization splitter rotator 162 and the second polarization coupler 164 (FIG. 4) are combined in a second two dimensional grating coupler 170.

One skilled in the pertinent art would understand that for some embodiments, the first optical transceiver 104 can be set as one of a receiver or a transmitter and the second optical transceiver 128 can be set as the other of the transmitter or the receiver.

Figure 6:
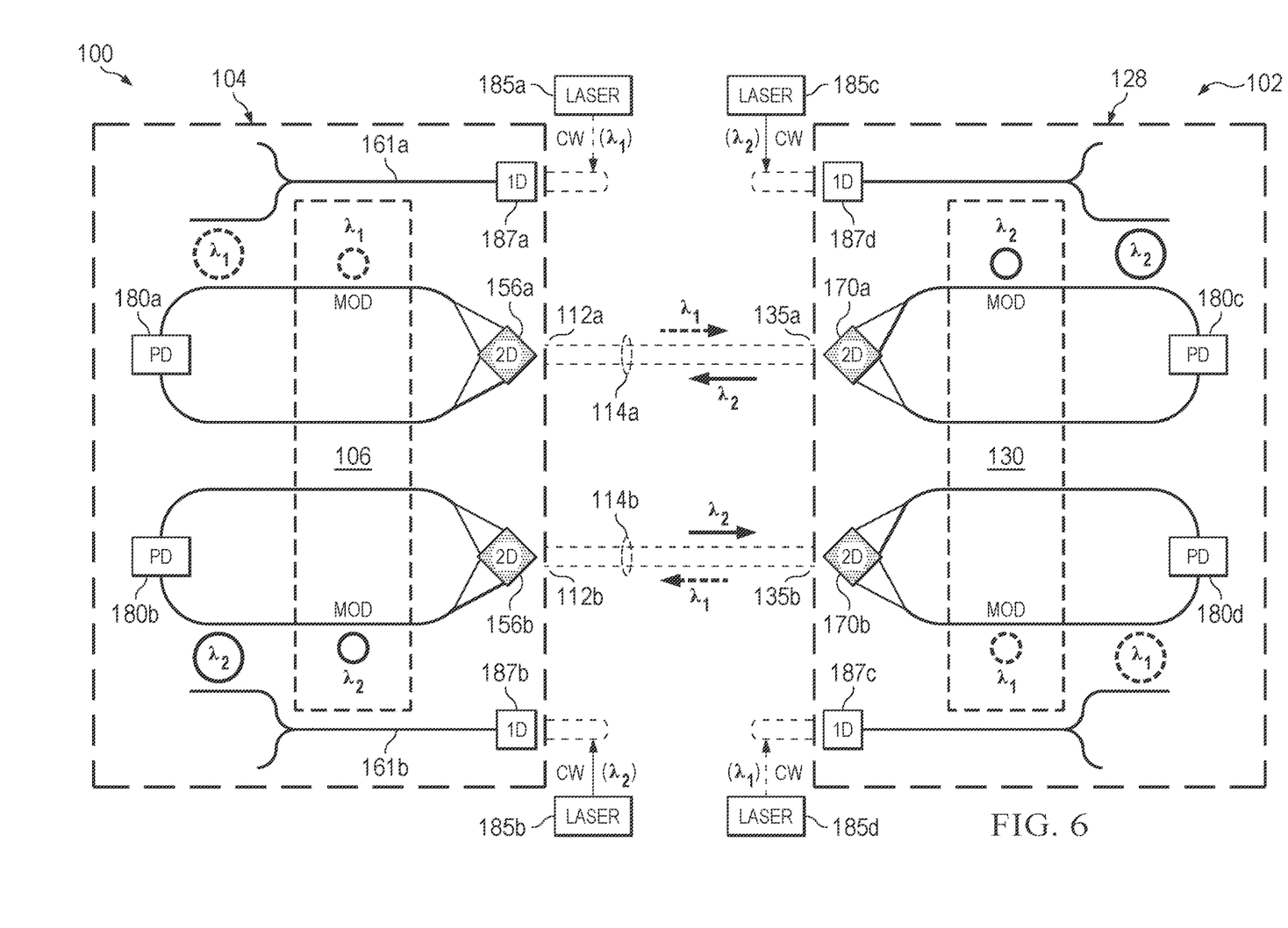
FIG. 6 presents a schematic diagram showing aspects of another example apparatus of the disclosure similar to the apparatus depicted in FIG. 5.
Figure 7:
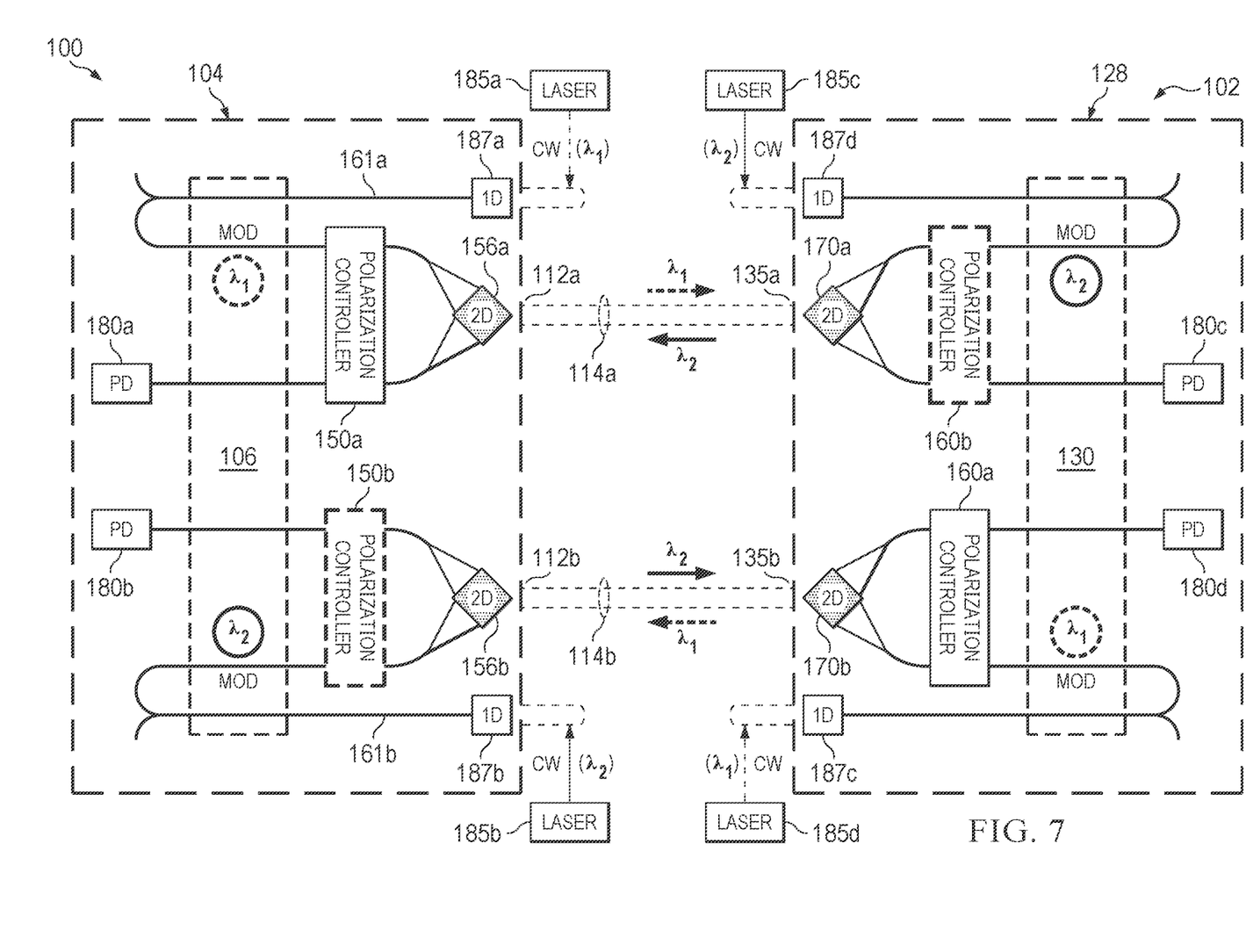
FIG. 7 presents a schematic diagram showing aspects of another example apparatus of the disclosure similar to the apparatus depicted in FIG. 5.

For any of the apparatus embodiments of the disclosure, and, as illustrated in FIGS. 1-2 and 4-5, the apparatus 100 can further include one of more photodetectors (e.g., photodiodes, PD, 180a, 180b; FIG. 6-7 photodiodes 180a ... 180d) optically coupled to the first notch filter 106 of the first optical transceiver 104. For instance the photodetectors can be optically coupled to an express port (e.g., EXP) of first and second optical add drop multiplexers/demultiplexers (e.g., OADM1 and/or OADM2).

For any of the apparatus embodiments of the disclosure, and, as illustrated in FIGS. 1-2 and 4-5, the apparatus 100 can further include an optical source (optical source 185, one or more lasers 185a, 185b, 1855c, 185d or other optical sources familiar to those skilled in the pertinent arts) that generate the continuous wave light beam (CW).

As illustrated in FIG. 5, in some embodiments the polarization couplers 187a, 187b of the first optical transceiver 104 can each be or include a one dimensional (1D) grating coupler.

As further illustrated in FIG. 5, in some embodiments, the first optical transceiver 104 can include the polarization controller 150, while in some embodiments the second polarization controller 160 of the second optical transceiver 128 can be optional (e.g., as indicated by dashed lines in the figure).

As illustrated in FIGS. 2 and 4, some embodiments of the apparatus 100 can include one or more drivers 190a, 190b (e.g., a CMOS drive circuit), where the first and second modulated optical signal 110, 122 carry data signals (e.g., data signals S1, S2) encoded from electrical bit sequences from the drivers 190a, 190b.

As illustrated in FIG. 4, some embodiments of the apparatus 100 can further include one or more polarization couplers 187c, 187d to optically couple a polarized state of the continuous wave (CW) light beam to the second notch filter 130 of the second optical transceiver 128, e.g., via add ports (e.g., ADD) of OADM3 and/or OADM4. As illustrated in FIG. 5, in some such embodiments, the one or more polarization couplers 187c, 187d of the second optical transceiver 128 can each be or include a one dimensional (1D) grating coupler.

As illustrated in FIG. 4, the third and fourth modulated optical signal 136, 146 can carry data signals (e.g., data signals S3, S4) encoded from electrical bit sequences from one or more drivers 190c, 190d.

FIG. 6 presents a schematic diagram showing aspects of another example apparatus of the disclosure analogous to the apparatus depicted in FIG. 5. The illustrated apparatus presents a simplified architecture carrying only two channels per propagation paths (e.g., optical fiber). Polarization diversity is used at the receiver (e.g., by providing symmetric length-matched arms for the off-resonant light). Such an embodiment is not simplex capable, e.g. a duplex configuration is required using two light propagation paths 114a, 114b.

The embodiment shown in FIG. 6 illustrates that, differing from the embodiment shown in FIG. 5, the first optical transceiver 104 or the second optical transceiver 128 does not include the polarization controllers 150, 160 and a polarization diversity scheme with dual-wavelength transmission is used instead. E.g., in such embodiments, polarization can be arbitrarily split at the 2D grating coupler (e.g., couplers 156a, 156b, 170a, 170b) based on the unknown fiber polarization rotation. Both parts of the signal can be routed with matched delay to the same photodetector, where they are recombined electrically in the detected photocurrent.

FIG. 7 presents a schematic diagram showing aspects of yet another example apparatus of the disclosure analogous to the apparatus depicted in FIG. 5. The illustrated apparatus provides another different simplified architecture again case carrying only two channels per propagation paths (e.g., optical fiber). Polarization control can be implemented by polarization controllers 150a and 160a at the receiving ends only, e.g., ends 112a, 135b of the light propagation paths 114a, 114b (e.g., polarization controllers 150a and 160a, respectively). One or both of the polarization controllers at the transmitting ends, e.g., ends 112b, 135a (e.g., polarization controllers 150b and 160b, respectively) can be optional. Such an embodiment is also not simplex capable, e.g. a duplex configuration is required using two light propagation paths 114a, 114b.

The architectures illustrated in FIGS. 6 and 7, by reducing or eliminating the polarization controllers, can advantageously: (1) provide a smaller transceiver footprint, (2) reduce power consumption due to the elimination of the optical phase shifters that are used within the polarization controller and elimination logical control circuitry that is required to operate it, and (3) lower optical losses which can reduce the optical sources (e.g., laser) power consumption.

Figure 8A:
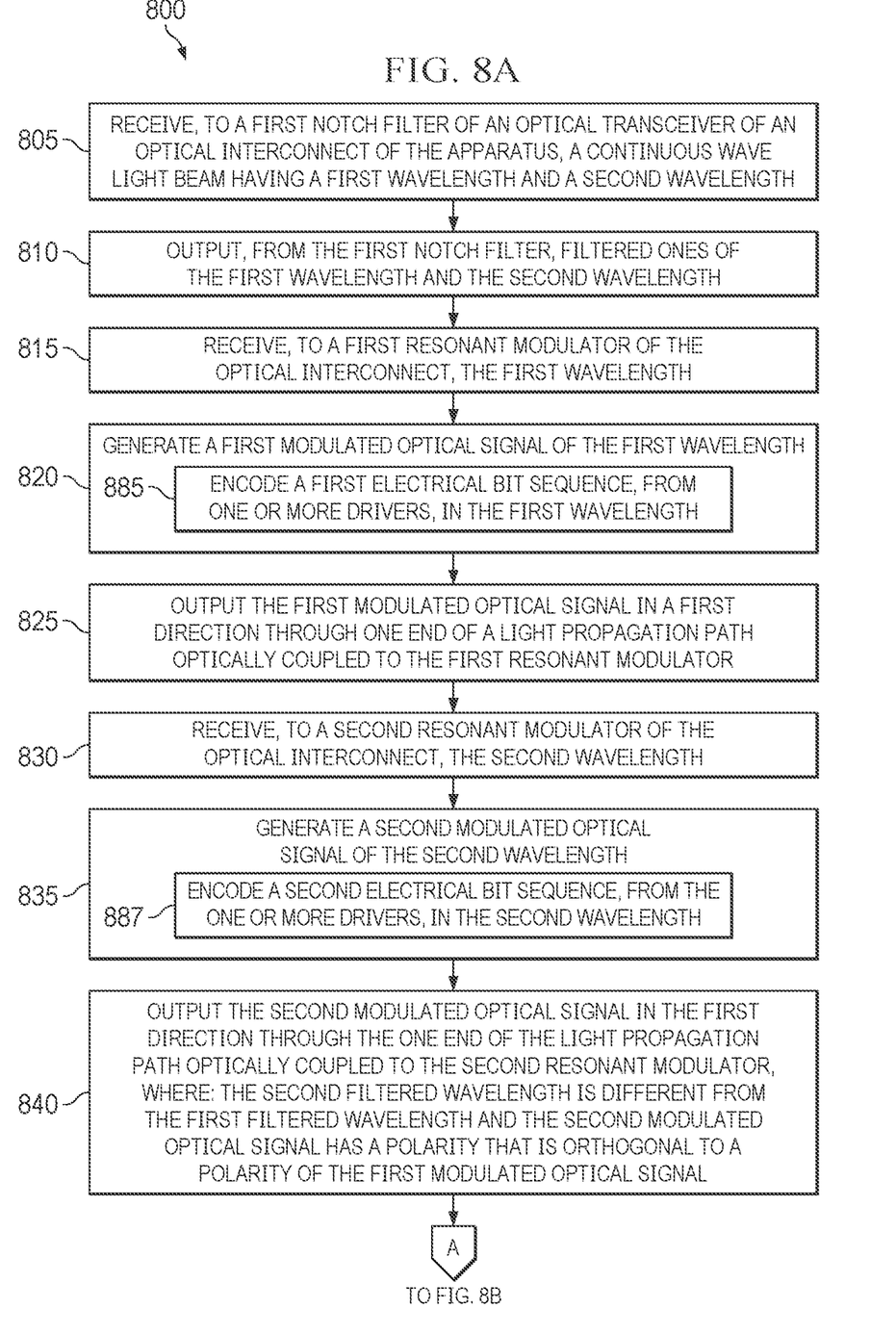
FIGS. 8A and 8B present a flow diagram of a method of communicating using an optical apparatus such as any embodiments of the apparatuses disclosed in the context of FIGS. 1-7.
Figure 8B:
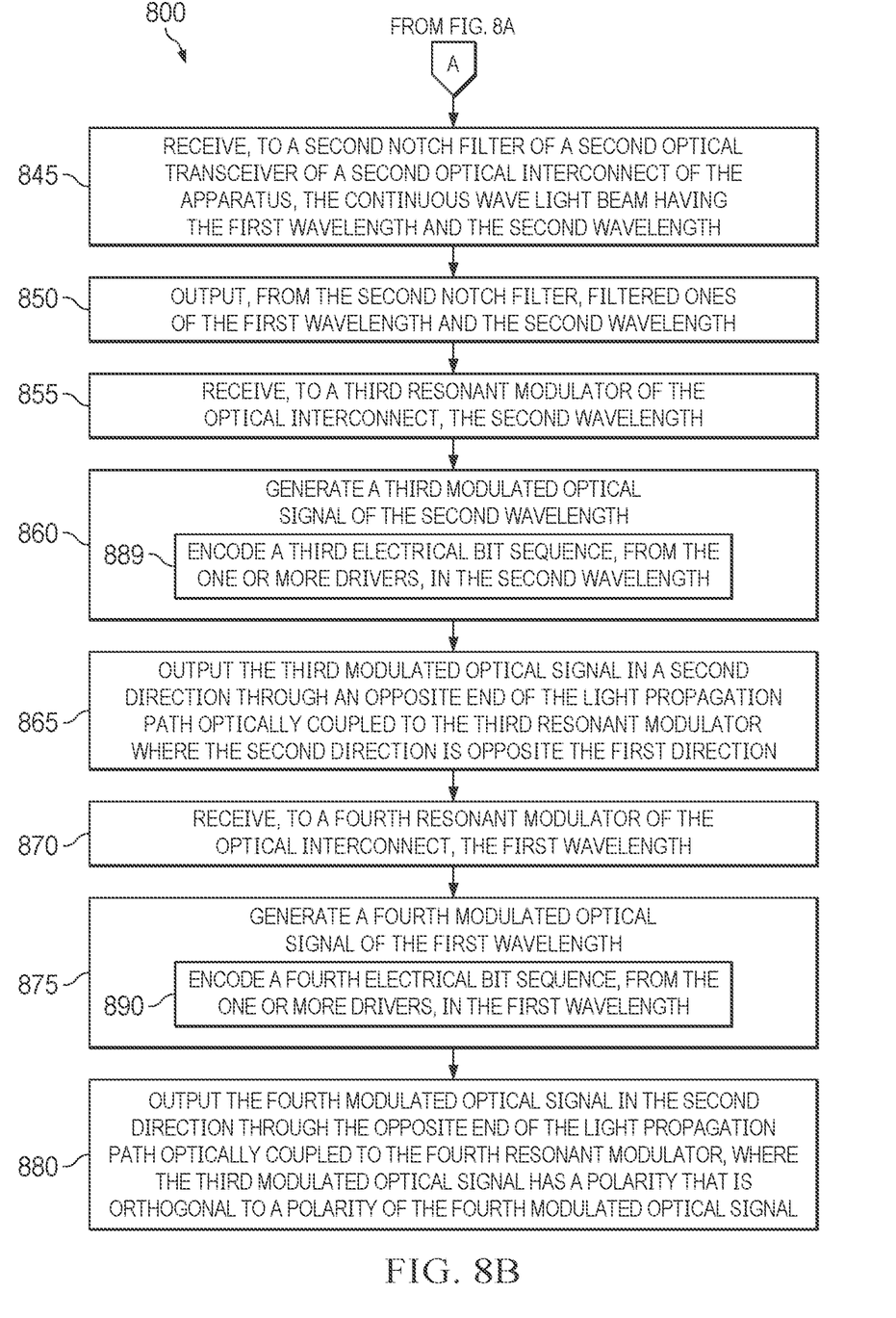

Another embodiment of the disclosure is a method of optical communication using an optical apparatus. FIGS. 8A and 8B present a flow diagram of an embodiment of a method 800 of communicating using an optical apparatus such as any embodiments of the apparatuses 100 disclosed in the context of FIGS. 1-7.

With continuing reference to FIGS. 1-8B embodiments of the method 800 can include receiving (step 805), to a first notch filter 106 of an optical transceiver 104 of an optical interconnect 102 of the apparatus, a continuous wave light beam having a first wavelength (e.g., λ1) and a second wavelength (e.g., λ2). The method can include outputting (step 810), from the first notch filter, filtered ones of the first wavelength and the second wavelength. The method can include receiving (step 815), to a first resonant modulator 108 of the optical interconnect, the first wavelength and generating (step 820) a first modulated optical signal 110 (e.g., S1) of the first wavelength. The method can include outputting (step 825) the first modulated optical signal 110 in a first direction (e.g., D1) through one end 112 of a light propagation path 114 optically coupled to the first resonant modulator. The method can include receiving (step 830), to a second resonant modulator 120 of the optical interconnect 102, the second wavelength and generating (step 835) a second modulated optical signal 122 (e.g., S2) of the second wavelength. The method can include outputting (step 840) the second modulated optical signal 122 in the first direction through the one end 112 of the light propagation path 114 optically coupled to the second resonant modulator 120. The second filtered wavelength is different from the first filtered wavelength and the second modulated optical signal 122 has a polarity that is orthogonal to a polarity of the first modulated optical signal 110.

Some embodiments of the method can include receiving (step 845) to a second notch filter 130 of a second optical transceiver 128 of the apparatus, the continuous wave light beam having the first wavelength and the second wavelength. Some embodiments include outputting (step 850), from the second notch filter, filtered ones of the first wavelength and the second wavelength. Some embodiments include receiving (step 855), to a third resonant modulator 134 of the optical interconnect, the second wavelength and generating (step 860) a third modulated optical signal 136 (e.g., S3) of the second wavelength. Some embodiments include outputting (step 865) the third modulated optical signal 134 in a second direction (e.g., D2) through an opposite end 135 of the light propagation path 114 optically coupled to the third resonant modulator, where the second direction is opposite the first direction. Some embodiments include receiving (step 870), to a fourth resonant modulator 144 of the optical interconnect, the first wavelength, and generating (step 875) a fourth modulated optical signal 146 (e.g., S4) of the first wavelength. Some embodiments include outputting (step 880) the fourth modulated optical signal 146 in the second direction through the opposite end 135 of the light propagation path 114 optically coupled to the fourth resonant modulator. The third modulated optical signal 136 has a polarity that is orthogonal to a polarity of the fourth modulated optical signal 146

In some embodiments, generating (step 820) the first modulated optical signal 110 of the first wavelength can include encoding (step 885), a first electrical bit sequence, from one or more drivers (e.g., first driver 190a), in the first wavelength. Generating (step 835) the second modulated optical signal 122 of the second wavelength can include encoding (step 887), a second electrical bit sequence from the one or more drivers (e.g., second driver 190b) in the second wavelength. Generating (step 860) the third modulated optical signal 136 of the second wavelength can include encoding (step 889), a third electrical bit sequence from the one or more drivers (e.g., third driver 190c) in the second wavelength. Generating (step 875) the fourth modulated optical signal 146 of the first wavelength can include encoding (step 890), a fourth electrical bit sequence from the one or more drivers (e.g., fourth driver 190*d*) in the first wavelength.

Those skilled in the art to which this application relates will appreciate that other and further additions, deletions, substitutions and modifications may be made to the described embodiments.

What is claimed is:

1. An optical apparatus, comprising:
    an optical interconnect, the optical interconnect including:
        a first optical transceiver, the first optical transceiver including:
            a first notch filter, the first notch filter including:
                a first optical add drop multiplexer demultiplexer connected to receive a continuous wave light beam and send a first filtered wavelength of the continuous wave light beam to a first resonant modulator, the first resonant modulator connected to send a first modulated optical signal in a first direction through one end of a light propagation path, and
                a second optical add drop multiplexer demultiplexer connected to receive the continuous wave light beam and send a second filtered wavelength of the continuous wave light beam to a second resonant modulator, the second resonant modulator connected to send a second modulated optical signal in the first direction through the end of the light propagation path, wherein
            the second filtered wavelength is different from the first filtered wavelength, and
            the second modulated optical signal has a polarity that is orthogonal to a polarity of the first modulated optical signal.

2. The optical apparatus of claim 1, wherein the optical interconnect further includes:
    a second optical transceiver, the second optical transceiver including:
        a second notch filter, the second notch filter including:
            a third optical add drop multiplexer demultiplexer connected to receive the continuous wave light beam and send the second filtered wavelength of the continuous wave light beam to a third resonant modulator, the third resonant modulator connected to send a third modulated optical signal in a second direction through an opposite end of the light propagation path, wherein the second direction is opposite the first direction, and
            a fourth optical add drop multiplexer demultiplexer connected to receive the continuous wave light beam and send the first filtered wavelength of the continuous wave light beam to a fourth resonant modulator, the fourth resonant modulator connected to send a fourth modulated optical signal in the second direction through the opposite end of the light propagation path, wherein the third modulated optical signal has a polarity that is orthogonal to a polarity of the fourth modulated optical signal.

3. The optical apparatus of claim 2, wherein the third resonant modulator includes a third micro-resonant modulator to produce the third modulated optical signal at the second filtered wavelength, the third modulated optical signal optically coupled to a second polarization controller, a second polarization splitter rotator and a second polarization coupler to the opposite end of the light propagation path to send the third modulated optical signal in the second direction.

4. The optical apparatus of claim 3, wherein the fourth resonant modulator includes a fourth micro-resonant modulator to produce the fourth modulated optical signal at the second filtered wavelength, the fourth modulated optical signal optically coupled to the second polarization controller, the second polarization splitter rotator and the second polarization coupler to send the fourth modulated optical signal in the second direction.

5. The optical apparatus of claim 4, wherein the second polarization splitter rotator and the second polarization coupler are combined in a second two dimensional grating coupler.

6. The optical apparatus of claim 2, further including one or more polarization couplers to optically couple a polarized state of the continuous wave light beam to the second notch filter of the second optical transceiver.

7. The optical apparatus of claim 6, wherein the one or more polarization couplers of the second optical transceiver each include a one dimensional grating coupler.

8. The optical apparatus of claim 2, wherein the third and fourth modulated optical signal carry data signals encoded from an electrical bit sequences from one or more drivers.

9. The optical apparatus of claim 1, wherein the first resonant modulator includes a first micro-resonant modulator to produce the first modulated optical signal at the first filtered wavelength, the first modulated optical signal optically coupled to a polarization controller, a polarization splitter rotator and a polarization coupler to the one end of the light propagation path to send the first modulated optical signal in the first direction.

10. The optical apparatus of claim 1, wherein the second resonant modulator further includes a second micro-resonant modulator to produce the second modulated optical signal at the second filtered wavelength, the second modulated optical signal optically coupled to the polarization controller, the polarization splitter rotator and the polarization coupler and to the one end of the light propagation path to send the second modulated optical signal in the first direction.

11. The optical apparatus of claim 10, wherein the polarization splitter rotator and the polarization coupler are combined in a two dimensional grating coupler.

12. The optical apparatus of claim 1, wherein the first optical transceiver is set as one of a receiver or a transmitter and the second optical transceiver is set as the other of the transmitter or the receiver.

13. The optical apparatus of claim 1, further including one or more photodetectors optically coupled to the first notch filter of the first optical transceiver.

14. The optical apparatus of claim 1, further including an optical source that generate the continuous wave light beam.

15. The optical apparatus of claim 1, further including one or more polarization couplers to optically couple a polarized state of the continuous wave light beam to the first notch filter of the first optical transceiver.

16. The optical apparatus of claim 15, wherein the polarization couplers of the first optical transceiver each include a one dimensional grating coupler.

17. The optical apparatus of claim 1, wherein the first and second modulated optical signal carry data signals encoded from electrical bit sequences from one or more drivers.

18. A method of communicating using an optical apparatus, comprising:
- receiving, to a first notch filter of an optical transceiver of an optical interconnect of the apparatus, a continuous wave light beam having a first wavelength and a second wavelength;
- outputting, from the first notch filter, filtered ones of the first wavelength and the second wavelength;
- receiving, to a first resonant modulator of the optical interconnect, the first wavelength;
- generating a first modulated optical signal of the first wavelength;
- outputting the first modulated optical signal in a first direction through one end of a light propagation path optically coupled to the first resonant modulator;
- receiving, to a second resonant modulator of the optical interconnect, the second wavelength;
- generating a second modulated optical signal of the second wavelength; and
- outputting the second modulated optical signal in the first direction through the one end of the light propagation path optically coupled to the second resonant modulator, wherein:
  - the second filtered wavelength is different from the first filtered wavelength, and
  - the second modulated optical signal has a polarity that is orthogonal to a polarity of the first modulated optical signal.

19. The method of claim 18, further including:
- receiving to a second notch filter of a second optical transceiver of the apparatus, the continuous wave light beam having the first wavelength and the second wavelength;
- outputting, from the second notch filter, filtered ones of the first wavelength and the second wavelength;
- receiving, to a third resonant modulator of the optical interconnect, the second wavelength;
- generating a third modulated optical signal of the second wavelength;
- outputting the third modulated optical signal in a second direction through an opposite end of the light propagation path optically coupled to the third resonant modulator, wherein the second direction is opposite the first direction;
- receiving, to a fourth resonant modulator of the optical interconnect, the first wavelength,
- generating a fourth modulated optical signal of the first wavelength; and
- outputting the fourth modulated optical signal in the second direction through the opposite end of the light propagation path optically coupled to the fourth resonant modulator, wherein the third modulated optical signal has a polarity that is orthogonal to a polarity of the fourth modulated optical signal.

20. The method of claim 19, wherein:
- generating the first modulated optical signal of the first wavelength includes encoding, a first electrical bit sequence, from one or more drivers, in the first wavelength;
- generating the second modulated optical signal of the second wavelength includes encoding, a second electrical bit sequence from the one or more drivers in the second wavelength;
- generating the third modulated optical signal of the second wavelength includes encoding, a third electrical bit sequence from the one or more drivers in the second wavelength; and
- generating the fourth modulated optical signal of the first wavelength includes encoding, a fourth electrical bit sequence from the one or more drivers in the first wavelength.

21. An optical filter for use in an optical transceiver, the optical filter comprising:
- a first notch filter including,
  - a first resonant modulator connected to send a first modulated optical signal in a first direction through a first end of a light propagation path, the first modulated optical signal having a first polarity,
  - a second resonant modulator connected to send a second modulated optical signal in the first direction through the first end of the light propagation path, the second modulated optical signal having a second polarity orthogonal to the first polarity,
  - a first optical add drop multiplexer demultiplexer connected to receive a continuous wave light beam and send a first filtered wavelength of the continuous wave light beam to the first resonant modulator, and
  - a second optical add drop multiplexer demultiplexer connected to receive the continuous wave light beam and send a second filtered wavelength of the continuous wave light beam to the second resonant modulator, wherein the second filtered wavelength is different from the first filtered wavelength.

22. The optical filter of claim 21, wherein the first resonant modulator includes a first micro-resonant modulator to produce the first modulated optical signal at the first filtered wavelength, the first modulated optical signal optically coupled to a polarization controller, a polarization splitter rotator and a polarization coupler to the one end of the light propagation path to send the first modulated optical signal in the first direction.

23. The optical filter of claim 21, wherein the second resonant modulator includes a second micro-resonant modulator to produce the second modulated optical signal at the second filtered wavelength, the second modulated optical signal optically coupled to the polarization controller, the polarization splitter rotator and the polarization coupler and to the one end of the light propagation path to send the second modulated optical signal in the first direction.

* * * * *